United States Patent
Alexander et al.

(12) 
(10) Patent No.: US 6,408,397 B1
(45) Date of Patent: Jun. 18, 2002

(54) USING RTC WAKE-UP TO ENABLE RECOVERY FROM POWER FAILURES

(75) Inventors: Marc D. Alexander; Peter A. Woytovech, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/317,309

(22) Filed: May 24, 1999

(51) Int. Cl.7 .................................................. G06F 1/30
(52) U.S. Cl. ....................................................... 713/340
(58) Field of Search ................................. 713/300–340

(56) References Cited

U.S. PATENT DOCUMENTS

| | | | |
|---|---|---|---|
| 4,763,333 A | 8/1988 | Byrd ............................. | 371/66 |
| 4,980,836 A | 12/1990 | Carter et al. ................. | 364/483 |
| 5,283,905 A | 2/1994 | Saadeh et al. ............... | 395/750 |
| 5,410,713 A | 4/1995 | White et al. ................. | 395/750 |
| 5,497,490 A | 3/1996 | Harada et al. ............... | 395/700 |
| 5,548,763 A | 8/1996 | Combs et al. ................ | 395/750 |
| 5,603,038 A | 2/1997 | Crump et al. ................ | 395/750 |
| 5,708,820 A | 1/1998 | Park et al. ................... | 395/750 |
| 5,710,930 A | 1/1998 | Laney et al. ................. | 395/750 |
| 5,715,465 A | 2/1998 | Savage et al. ............... | 395/750 |
| 5,758,174 A * | 5/1998 | Crump et al. | |
| 5,765,004 A | 6/1998 | Foster et al. ........... | 395/750.05 |
| 5,771,390 A * | 6/1998 | Walker et al. | |

* cited by examiner

Primary Examiner—Paul R. Myers
(74) Attorney, Agent, or Firm—Haynes and Boone, LLP

(57) ABSTRACT

A method and apparatus enables a computer system to recover from power failures, and includes a computer system having a UPS connected to a computer, the computer having an RTC, a driver, and a program stored in the computer's memory. The program has instructions for performing the following steps: a) when a source of AC power fails, the UPS supplying AC power to the computer; b) the UPS notifying the computer to shut down; and c) just before the computer shuts down, the driver setting the RTC for a wake-up time at a prescribed time in the future.

15 Claims, 1 Drawing Sheet

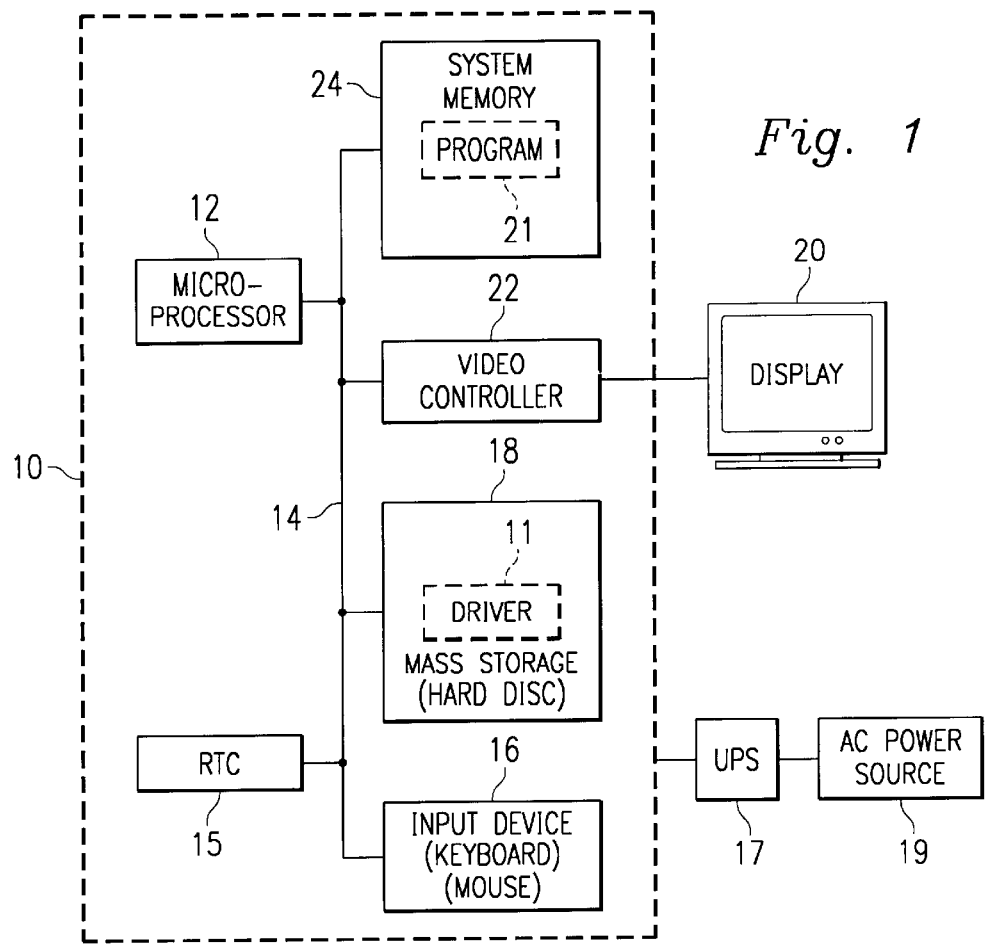
Fig. 1
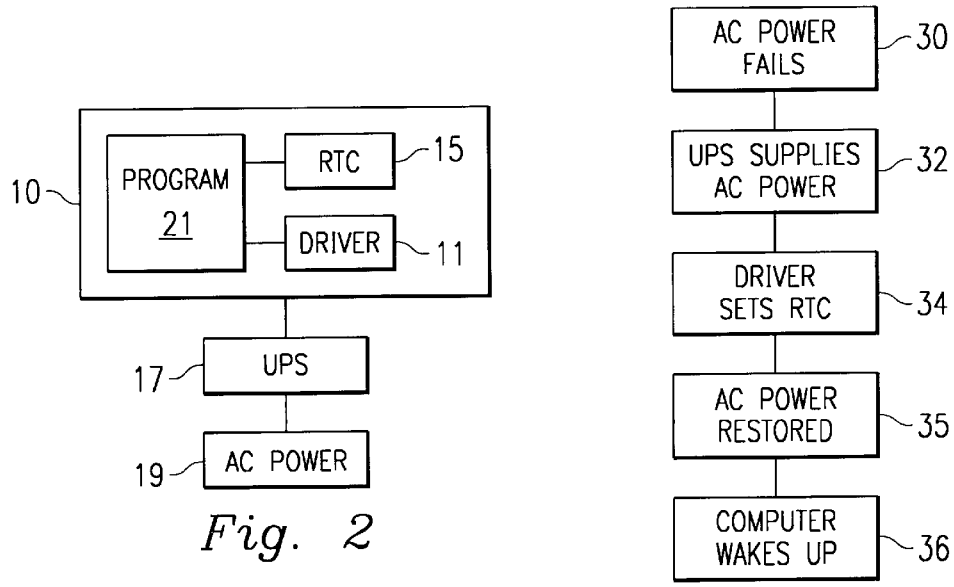
Fig. 2
Fig. 3

USING RTC WAKE-UP TO ENABLE RECOVERY FROM POWER FAILURES

BACKGROUND

This invention relates to the field of computers, and particularly to uninterruptible power supplies.

When an uninterruptible power supply ("UPS") system has detected a power loss, it can notify the computer to power down, via a communications mechanism such as USB or a serial port. The UPS driver can then perform an orderly shutdown on battery-supplied AC power, and power down the system before the battery-supplied AC power is lost. The problem is that when AC power is restored, there is no way for the computer to recognize that it should return to the "power on" state, because the computer was previously in a power off state when battery power expired.

Attempts to have been made to provide an uninterruptible supply of power to computer systems. In U.S. Pat. No. 4,763,333 a device for preventing unintentional loss of data in a computer system a a result of electrical power interruption comprises a standby power supply, a monitor circuit for generating signals when the main power is interrupted and restored and for monitoring the condition of the uninterruptible supply, and an auxiliary memory circuit. The memory circuit includes a large non-volatile or continuously powered memory and a program stored in ROM which takes over control of the computer and is executed by the CPU when a power interruption is signaled by the monitor circuit. The program allows operations already in progress to be completed and then directs a transfer of the computer's operating state and any application programs and operating system from the computer's RAM to the memory circuit's auxiliary memory. When main power is restored, the ROM program directs the CPU to reload the application programs and operating system into the computer's RAM and to restore the state of the CPU.

In U.S. Pat. No. 4,980,836, a battery powered computer system monitors the address bus to determine when selected peripheral devices have not been accessed for a preset amount of time. When the preset amount of time has passed, the system powers itself down and stops the system clock, placing it in a standby mode. The system is awakened by depressing a standby switch, unless there is insufficient energy in the batteries, under which circumstances an AC power source must be connected before the system can be awakened.

U.S. Pat. No. 5,283,905 discloses a power supply for a computer system manager, wherein the power supply has its own secondary power source operable when input power to the system manager no longer meets preset threshold values. The power supply functions in one of the discrete number of power modes depending upon the amount of energy available from either the computer input power or the secondary power source. The power supply switches to one of the group of power modes to conserve secondary power when the computer input power is no longer available. The power modes are controlled by a power mode controller which selectively directs power to discrete components of the system manager as a power conservation technique. The power mode controller always energizes the random access memory of the system manager in order to maintain data integrity. Upon detecting insufficient energy within the secondary power source, the power mode controller terminates all power flow from the power supply, including power flow to the random access memory, at which point the entire system has lost all data and configuration settings.

In U.S. Pat. No. 5,410,713, a power management system for a personal computer comprises a power management processor, a switchable power supply and a keep alive power supply. The processor is powered by the keep alive power supply that continuously provides power. The computer is powered by a power supply that is switchable in response to a control signal. The processor preferably controls the switchable power supply. The processor is coupled to receive external device interrupts from a plurality of external devices that instruct the processor when to turn the switchable power supply on and off. The processor is also coupled to the computer through an interface.

In U.S. Pat. No. 5,497,490, information associated with the adapter unit configuration existing when system power was last turned off is stored in both a non-volatile RAM (NVRAM) and in a reserved area of a hard disk drive (HDD) which holds information associated with both the presently existing adapter configuration and previously existing configurations. Detected ID's of currently connected adapter units are compared first to identity information in the NVRAM, and if a match is detected the associated state information in the NVRAM is used to initialize the currently connected adapter units. If a mismatch is detected, the detected unit ID's are compared to sets of ID's contained in index functions stored in the HDD. If a match is found in this comparison, configuration state information associated with the respective index function is retrieved, written to the NVRAM and applied to the currently connected adapter units.

U.S. Pat. No. 5,548,763 discloses a computer system having four states of power management: a normal operating state, a standby state, a suspend state, and an off state. The standby state is characterized by devices, such as a video controller and a hard drive, being placed into a low-power mode transparent to the operating system and the applications executing on the computer system. The suspend state is characterized by executing code being interrupted and the state of the computer system being saved to a file on the hard drive in such a manner that system power may be removed after the state of the computer system is saved to the hard drive. Later, after system power is restored, the state of the computer system is resumed by reading from the hard drive and loading it in such a manner that the operating system and application programs are not adversely affected. The normal operating state and the off state correspond to the typical on and off states of more conventional computer systems.

U.S. Pat. No. 5,603,038 discloses a computer system having a CPU, a non-volatile storage device, a power management processor having a volatile power management configuration, and a power supply in circuit communication. Responsive to the AC power to the power supply being interrupted, the CPU restores the volatile power management configuration to the power management processor. The power management configuration comprises a value corresponding to a wake alarm and whether the power management processor responds to external events.

U.S. Pat. No. 5,708,820, discloses a network hibernation system for use with a computer connected to a local area network (LAN) which is capable of retaining both data from the computer and data from the network environment created in connection with a LAN in the event of a power failure and also in the event that the computer is idle for a predetermined time period. Upon the restoration of power, the states of the computer and network hibernation system are resumed to the point before the occurrence of the power failure or the idle period.

In U.S. Pat. No. 5,710,930, a method of allowing an operating system of a computer system to persist across a power off and on cycle is described. The method includes the step of detecting if the computer system is to be powered off. If the computer system is detected to be powered off, the state of the computer system is then preserved by storing data representing the state of the computer system in a designated area of a nonvolatile memory of the computer system. A system initialization code of the operating system is then replaced with a new system initialization code that branches to a restart code that accesses to the designated area of the nonvolatile memory such that when the computer system is again powered on, the restart code accesses the designated area of the nonvolatile memory for the data to restore the computer system to the state before the computer system was powered off.

U.S. Pat. No. 5,715,465 discloses a last power state apparatus including a power supply controller having a battery-backed memory bit for retaining the power state of an electronic device during a failure of a primary power source. The battery is preferably a lithium type battery and the power supply preferably provides a flea power signal when primary power is available to maintain the state of the memory bit even if the power supply is off. The controller asserts a power status signal to the power supply based on the state of the memory bit, so that the power supply remains off or powers up as appropriate when primary power is next available. A momentary power switch is used to manually turn on and off the power supply and the electronic device by toggling the memory bit. The electronic device, which is typically a computer system, provides signals to the power supply controller to turn off the device. Further, the computer can enable an interrupt to prevent the user from turning off the device until after vital functions are completed. Also, other events, such as a real time clock (RTC) alarm, or the activation of a modem are monitored to toggle the memory bit to turn on the device. The RTC also monitors the battery voltage and provides a standard battery valid signal, where the controller resets the memory bit to a default off state if the battery voltage falls below a predetermined minimum value.

In U.S. Pat. No. 5,765,004, a laptop computer system includes a protected mode microprocessor capable of operating in restricted and unrestricted modes, and an arrangement which in response to a predetermined condition saves information from the processor and then forcibly switches the processor to its unrestricted mode of operation. When running a multi-tasking operating system where an application program is being executed in a restricted mode, a suspended/resume operation can be carried out in which the system is substantially powered down and then powered back up, and will resume the interrupted application with the restricted mode back in effect.

Therefore, what is needed is a system that will always return to the "power on" state when power is restored so that a software driver uses a real time clock (RTC) to set a wake-up time.

SUMMARY

One embodiment accordingly, sets a wake-up time a prescribed time in the future before powering down the computer system. To this end, a computer system includes a universal power supply (UPS), an RTC, a driver, and a program stored in a memory in the computer system. The program includes instructions for performing the following steps: the UPS supplies AC power to the computer system when a source of AC power fails, the UPS notifies the computer system to shut down, and just before the computer system shuts down, the driver sets the RTC for a wake-up time a prescribed time in the future.

A principal advantage of this embodiment is that if the wake-up time occurs before AC power is restored, the system will wake-up when power is restored because the RTC is latched.

BRIEF DESCRIPTION OF THE DRAWING FIGURES

FIG. 1 is a block diagram illustrating an embodiment of a computer system.

FIG. 2 is a block diagram illustrating another embodiment of a computer system.

FIG. 3 is a flow chart illustrating an embodiment of a method disclosed.

DETAILED DESCRIPTION

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touch screens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20 which is coupled to microprocessor 12 by a video controller 22. A system memory 24 includes a program 21 and is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor. An RTC is coupled to bus 14. Mass storage device 18 includes a software driver 11. A UPS 17 or other external device for controlling power sequencing is connected to the system 10. The UPS 17 receives power from an AC power source 19.

Referring to FIG. 2, the computer system 10 includes program 21, the software driver 11, and the RTC 15. The computer system 10 connects to the UPS 17, which in turn connects to the source of AC power 19.

Referring to FIG. 3, in step 30, the AC power 22 fails. In step 32, the UPS supplies battery power to the computer system 10 until the battery power is low, at which time the UPS 17 notifies the computer system 10 to shut down. In step 34, just before the computer system 10 shuts down, the software driver 11 sets the RTC 18 for a wake-up time at a prescribed time in the future, then shuts down the computer system 10. In step 36, if the wake-up time occurs before the source of AC power is restored at step 35, the computer system 10 will wake up when the AC power is restored, because the RTC 18 wake-up notification is latched. If the wake-up time occurs after AC power is restored at step 35, the computer system 10 will wait until the time set in step 34 before waking up. The prescribed time is a time period of up to 5 minutes, and preferably from about 1 minute to about 2 minutes.

As a result, one embodiment provides a computer system 10 including a UPS 17, an RTC 15, a software driver 11, and a program 21 stored in a memory in the computer system.

The program 21 includes instructions for performing the following steps: when a source of AC power 19 fails, the UpS 17 supplies AC power 19 to the computer system 10, the UPS 17 notifies the computer system 10 to shut down, and just before the computer system 10 shuts down, the driver 11 sets the RTC 15 for a wake-up time at a prescribed time in the future.

Another embodiment provides the computer system 10 wherein the program 21 includes instructions for performing the following steps: the UPS 17 notifies the computer system 10, to shut down when the source of AC power 19 fails; the UPS 17 supplies AC power to the computer system 10, and just before the computer system 10 shuts down, the software driver 11 sets the RTC 15 for a wake-up time at a prescribed time in the future.

A further embodiment provides a method to enable the computer system 10 to recover from power failure. The computer system 10 includes program 21, stored in the memory 24 of the computer system 10. The method includes the steps of: the UPS 17 notifying the computer system 10 to shut down when the source of AC power 19 fails, the UPS 17 supplying AC power to the computer system 10, and just before the computer system 10 shuts down, the drive 11 setting the RTC 15 for a wake-up time at a prescribed time in the future.

A still further embodiment provides a method to enable the computer system 10 to recover from power failures. The computer system 10 includes program 21. The method includes the steps of: the UPS 17 supplying AC power to the computer system 10 when the source of AC power 19 fails, the UPS 17 notifying the computer system 10 to shut down, and just before the computer system 10 shuts down, the driver 11 setting the RTC 15 for a wake-up time at a prescribed time in the future.

As it can be seen, the principal advantages of these embodiments are that because it is always desired to return to the "power on" state when the power is restored, the driver uses the RTC to set a wake-up time a short prescribed time in the future before powering down the computer system. If the wake-up time occurs before AC power is restored, the computer system will wake up when power is restored, because the RTC trigger is latched.

Although an illustrative embodiment of the invention has been shown and described, a wide range of modification, change, and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A computer system comprising:
   a microprocessor;
   an input coupled to provide input to the microprocessor;
   a mass storage coupled to the microprocessor;
   a driver;
   a display coupled to the microprocessor by a video controller;
   a memory coupled to provide storage to facilitate execution of a computer program by the microprocessor;
   an RTC;
   an external device to control power sequencing to the computer system;
   a program stored in the memory, the program having instructions for performing the following steps:
   the external device supplying AC power to the computer system when a source of AC power fails;
   the external device notifying the computer system to shut down; and
   just before the computer system shuts down, the driver setting the RTC for a wake-up time at a prescribed time in the future.

2. A system as defined in claim 1 wherein the driver is a software driver.

3. The system as defined in claim 1 wherein the external device is a UPS.

4. A computer system comprising:
   an external device to control power sequencing to the computer system;
   an RTC;
   a driver; and
   a program stored in a memory in the computer system, the program having instructions for performing the following steps:
   when a source of AC power fails, the external device supplying AC power to the computer system;
   the external device notifying the computer system to shut down; and
   just before the computer system shuts down, the driver setting the RTC for a wake-up time at a prescribed time in the future.

5. The system as defined in claim 4 wherein the driver is a software driver.

6. The system as defined in claim 4 wherein the external device is a UPS.

7. A computer system comprising:
   an external device to control power sequencing to the computer system;
   an RTC;
   a driver; and
   a program stored in a memory of the computer system, the program having instructions for performing the following steps:
   when a source of AC power fails, the external device notifying the computer system to shut down;
   the external device supplying AC power to the computer system; and
   just before the computer system shuts down, the driver setting the RTC for a wake-up time at a prescribed time in the future.

8. The system as defined in claim 7 wherein the driver is a software driver.

9. The system as defined in claim 7 wherein the external device is a UPS.

10. A method to enable a computer system to recover from power failures, the computer system having an external device for controlling power sequencing to the computer system, an RTC, a driver, and a program stored in a memory in the computer system, the method comprising the steps of:
    when a source of AC power fails, the external device notifying the computer system to shut down;
    the external device supplying AC power to the computer system; and
    just before the computer system shuts down, the driver setting the RTC for a wake-up time at a prescribed time in the future.

11. The method as defined in claim 10 wherein the driver is a software driver.

12. The method as defined in claim 10 wherein the external device is a UPS.

13. A method to enable a computer system to recover from power failures, the computer system having an external device for controlling power sequencing to the computer system, an RTC, a driver, and a program stored in a memory in the computer system, the method comprising the steps of:

when a source of AC power fails, the external device supplying AC power to the computer system;

the external device notifying the computer system to shut down; and just before the computer system shuts down, the driver setting the RTC for a wake-up time at a prescribed time in the future.

14. The method as defined in claim 13 wherein the driver is a software driver.

15. The method as defined in claim 13 wherein the external device is a UPS.

* * * * *